UNITED STATES PATENT OFFICE.

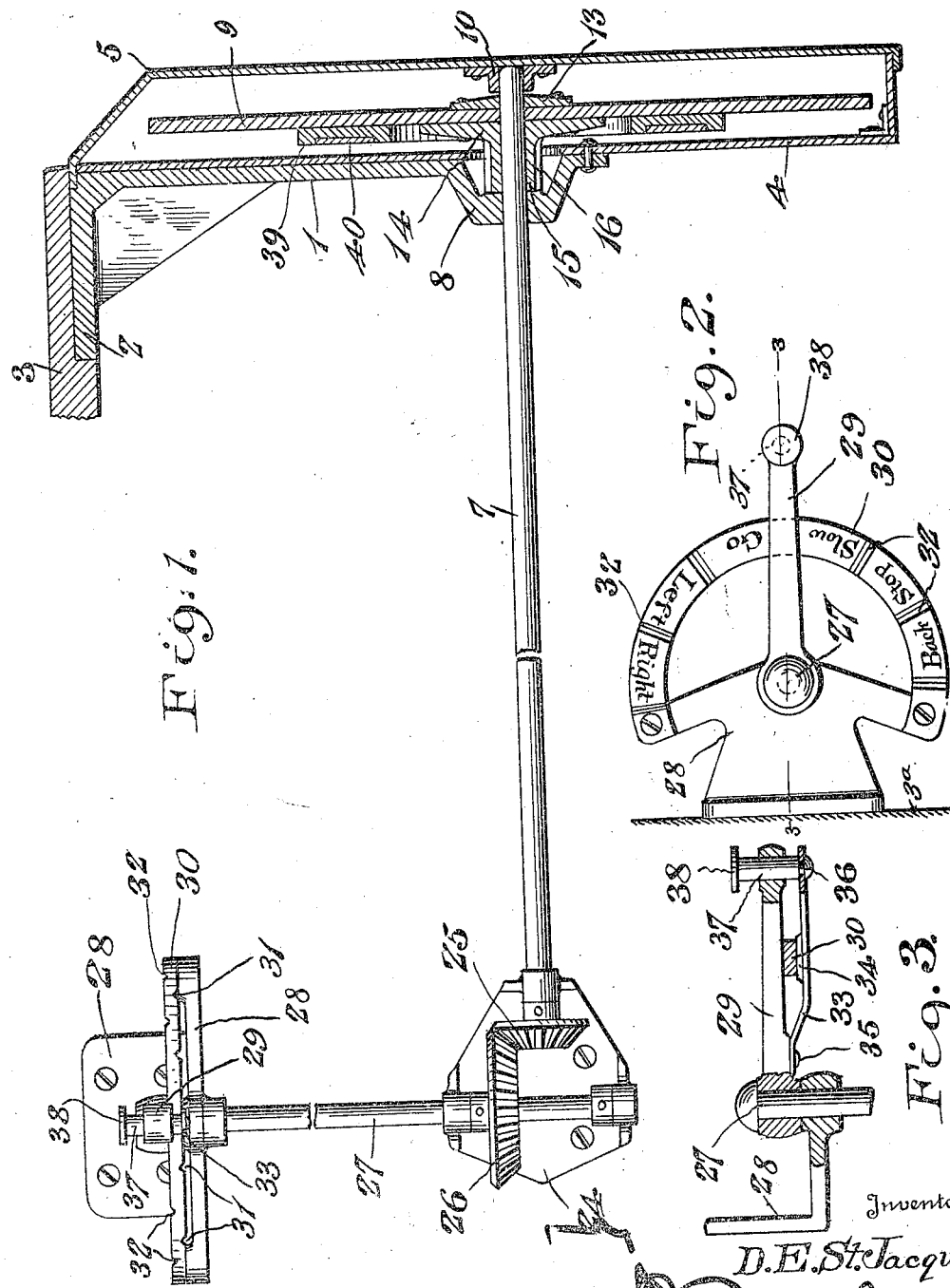

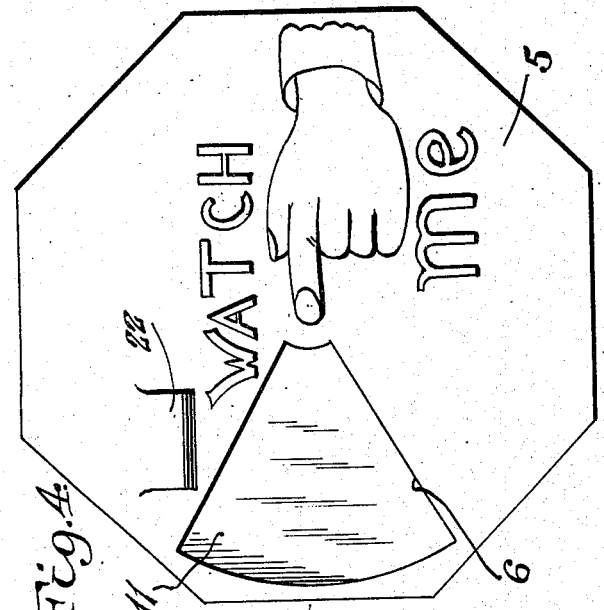
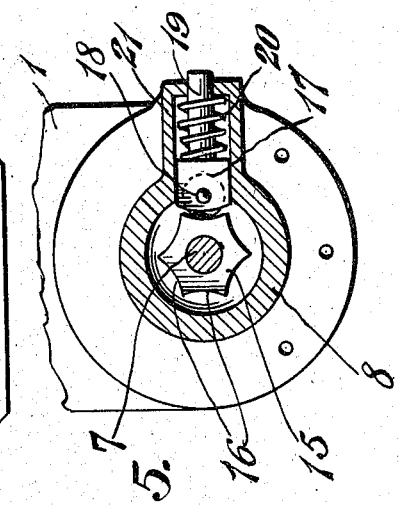
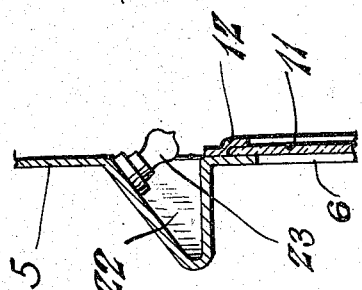
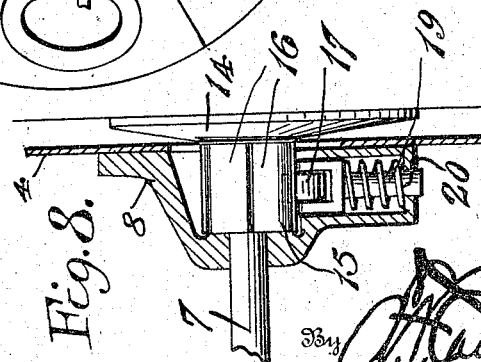

DELPHIS E. ST. JACQUES, OF SPRINGFIELD, MASSACHUSETTS.

AUTOMOBILE-SIGNAL.

1,171,365.  Specification of Letters Patent.  Patented Feb. 8, 1916.

Application filed January 29, 1915.  Serial No. 5,066.

*To all whom it may concern:*

Be it known that I, DELPHIS E. ST. JACQUES, citizen of the United States, residing at Springfield, in the county of Hampden and State of Massachusetts, have invented certain new and useful Improvements in Automobile-Signals; and I do hereby declare the following to be a full, clear, and exact description of the invention, such as will enable others skilled in the art to which it appertains to make and use the same.

This invention relates to signals for auto vehicles, and one of the principal objects of the same is to provide simple, reliable and efficient means for indicating at the rear of auto vehicles the direction in which the vehicle is about to turn, or whether it is to stop, or go slow, or to back up.

Another object of the invention is to provide a signal comprising a rotary disk having various directions or indications thereon in the way of words to indicate the condition at the head of the auto vehicle, and means within reach of the driver to turn the disk so that the various instructions may be conveyed to the vehicles in the rear.

The foregoing and other objects may be attained by means of the construction illustrated in the accompanying drawings, in which—

Figure 1 is a horizontal sectional view and partial plan view of an auto vehicle signal made in accordance with this invention, Fig. 2 is a view in elevation of the lever rack or sector for indicating the position of the dial or disk at the rear of the vehicle, Fig. 3 is a detail sectional view taken on the line 3—3 of Fig. 2, Fig. 4 is a view in elevation of the casing for containing the indicator dial, Fig. 5 is a detail sectional view of a friction device for holding the shaft in any of its adjusted positions, Fig. 6 is a view in elevation or plan of the indicating device removed from the casing, Fig. 7 is a detail sectional view showing the lights within the casing, and Fig. 8 is a detail sectional view of the friction device for holding the longitudinal shaft in adjusted position.

Referring to the drawings, the numeral 1 designates a bracket provided with an angular member 2 secured to a portion of the auto vehicle frame 3 at the rear end thereof. Supported upon the bracket 1 is a casing 4 provided with a cover 5. The cover 5 has an opening 6 in the lower side thereof and upon the cover 5 appears the words "Watch me" with an index hand pointing to the opening 6.

A longitudinal shaft 7 extends through the bracket 1 at the enlarged portion 8, and secured to the end of the shaft 7 within the casing 4 is a disk 9, said disk upon its outer face being provided with indicating directions thereon comprising the words "Stop", "Back", "Right", "Left", "Go", and "Slow". The extreme of the shaft 7 is mounted in a boss 10 secured by rivets to the cover 5 of the casing. A piece of glass 11 is secured in front of the opening 6 by holding devices 12. The indicating disk 9 is provided with a face plate 13 upon one side thereof, said face plate being connected to the disk, and upon the opposite side of the disk is a face plate 14 having a hub 15 extending into the enlarged portion of the bracket 1. The hub 15 is provided with curved surfaces 16 corresponding to the positions of the indicating words on the disk 9, and in order to hold the shaft rigid in position when one of the words is adjusted in relation to the opening 6, a spring detent comprising a head 17 having a roller 18 mounted therein is provided with a shank 19 encircled by a spring 20, said spring being disposed in a housing 21 formed in the enlarged portion 8 of the bracket 1.

In the cover 5 of the casing is a recess 22 for an electric light bulb 23 located at the side of the opening 6. The front end of the shaft 7 is mounted in a bearing plate 24 adjacent to the driver's seat, and said shaft is provided with a beveled gear 25 which meshes with a similar gear 26 on a shaft 27 extending at right angles to the shaft 7 and mounted in a sector rack 28 secured to the frame 3ª of the auto vehicle within reach of the driver. Fixed to the outer end of the shaft 27 is a lever 29. The sector rack is provided with a curved or arcuate indicator 30 on the inner side of which the words "Right", "Left", "Go", "Slow", "Stop", and "Back" appear. Between these words are grooves 31, while upon the opposite side of the rack 30 are similar grooves 32 arranged intermediate the grooves 31, as shown more clearly in Fig. 1. Secured to the lever 29 is a spring pawl 33 having a detent 34 secured thereto. The pawl 33 is secured by means of a rivet 35 to the lever 29 at one end, while the opposite end is provided with an opening to receive the reduced portion 36 of a push button 37 provided with a head 38. When it is desired to remove the detent 34 from the grooves 31, the button 37 is pushed inward against the tension of the spring pawl 33 when the lever 29 may be moved to any position indicated upon the sector 30 and the same indication will appear at the opening 6 in the cover 5. The grooves 32 are for a left hand drive, and the grooves 31 for a right hand drive.

Secured to the rear side of the indicator disk 9 is a wood or fibrous ring 39 having a recess in the front side thereof to reinforce the disk 9 and a piece of copper 40 secured in said recess to provide a weight for balancing said disk. An electric light bulb may be disposed near the sector rack as well as in the casing, in order that the lever 29 may be adjusted properly to indicate the conditions of the road in advance through the opening 6 on the disk 9.

From the foregoing it will be obvious that a guard or signal made in accordance with this invention will eliminate many accidents, and can be readily connected to any auto vehicle.

Various changes may be made in the details of construction without departing from the spirit and scope of the invention as defined in the claims.

What is claimed is:—

1. An automobile signal comprising a bracket secured to the frame of an automobile, an enlarged portion formed on said bracket, and provided with an aperture therein, a cover secured to the bracket and provided with an opening therein, a bearing secured to said cover and in horizontal alinement with the aperture of the enlarged portion, a shaft extending through the enlarged portion and into the bearing, a disk mounted on said shaft, means mounted in the enlarged portion for controlling the disk at predetermined points, and means for rotating the shaft.

2. An automobile signal comprising a bracket secured to the frame of an automobile, an enlarged portion formed on said bracket, and provided with an aperture therein, a cover secured to the bracket and provided with an opening therein, a bearing secured to said cover and in horizontal alinement with the aperture of the enlarged portion, a shaft extending through the enlarged portion and into the bearing, a disk mounted on said shaft and provided with directions thereon, means mounted in the enlarged portion for controlling the disk at predetermined points, a reinforcing disk secured to the rear walls of the disk and provided with a recess therein, a weight mounted in said recesses adapted to balance said disk and means for rotating the shaft.

3. An automobile signal comprising a bracket secured to the frame of an automobile, an enlarged portion formed on said bracket and provided with an aperture therein, a casing secured to said bracket and extending beyond the lower ends of the bracket, said casing provided with an aperture therein in horizontal alinement with the aperture of the enlarged portion, a cover secured to the bracket and to the casing and provided with an opening therein, a bearing secured to said cover and in horizontal alinement with the aperture of the enlarged portion and the aperture of the casing, a shaft extending through the enlarged portion and into the bearing, a disk mounted on said shaft, means mounted in the enlarged portion for controlling the disk at predetermined points, and means for rotating the shaft.

In testimony whereof I affix my signature in presence of two witnesses.

DELPHIS E. ST. JACQUES.

Witnesses:
 NELSON E. ST. JACQUES,
 RALPH M. WIGHT.